3,407,667
OMNIDIRECTIONAL INERTIAL TRIGGER
APPARATUS
Karl H. Doeringsfeld, Edina, Minn., assignor to
Honeywell Inc., Minneapolis, Minn., a corporation of Delaware
Filed Nov. 17, 1965, Ser. No. 508,329
6 Claims. (Cl. 73—492)

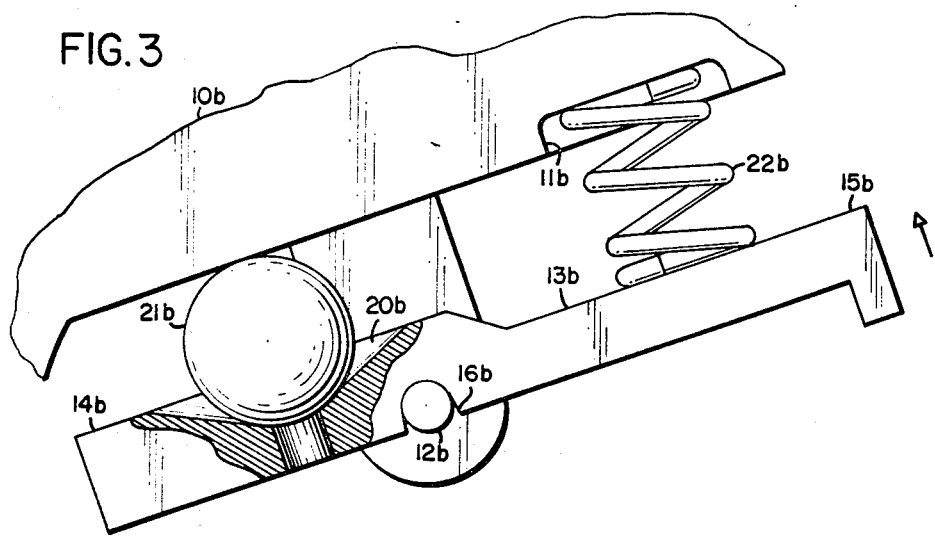
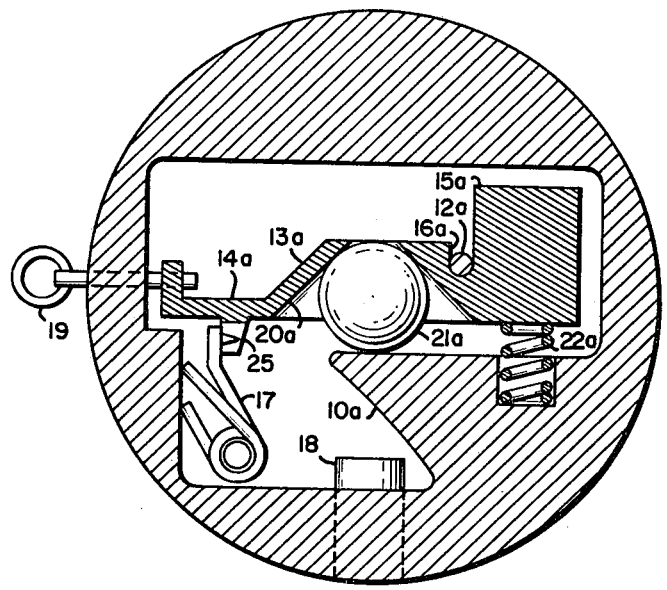
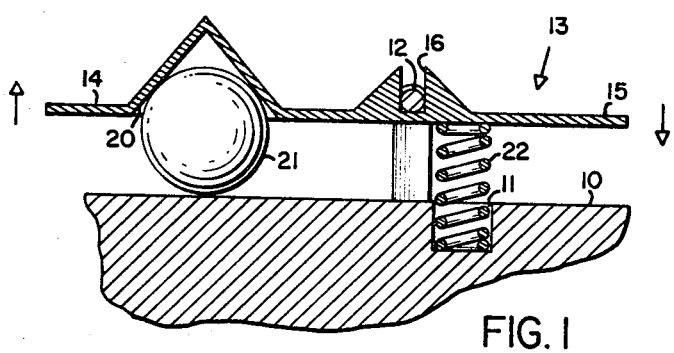
FIG. 3
FIG. 2
FIG. 1
INVENTOR.
KARL H. DOERINGSFELD United States Patent Office 3,407,667
Patented Oct. 29, 1968

ABSTRACT OF THE DISCLOSURE

Inertial trigger mechanism providing a unidirectional mechanical output in response to an inertial force from any direction.

The invention

The present invention relates in general to inertial force sensors and in particular to an improved omnidirectional inertial force sensor that will provide a unidirectional output.

Inertial sensors of the type described herein are designed to respond instantaneously to a sudden acceleration or deceleration of a predetermined magnitude. A common application of such devices is in the field of munition fuzing, especially in those applications in which the munition must be armed or detonated upon impact with the ground. The typical impact sensor disclosed by the prior art utilizes a movable seismic mass that is biased to a normal position by compressed springs or magnetic attraction. This seismic mass is often shaped in the form of a cylinder or ball and is constrained to move through a closed chamber against the restraining force of the biasing means upon the receipt of an inertial force from the proper direction. Means are also provided to sense the movement of the seismic mass from the normal position upon impact. The inertial sensor may provide a switching action if used with an electrical system or it may provide a mechanical output if utilized with a purely mechanical system.

Many inertial sensors are designed to be responsive only to inertial forces applied from a single direction. Such devices are usable only in vehicles that are always oriented in the same direction at the time the inertial force is received. Such devices cannot be used in a vehicle that is not designed to be oriented in a specific manner at the time the inertial force is received. In munitions, such as grenades, for example, which often are not oriented to strike the target in one specific manner, an impact sensor must be used that is responsive to a given inertial force applied from any direction. The present invention is designed specifically for use in such applications since it is capable of performing its function upon the receipt of an inertial force from any direction.

Omnidirectional impact sensors per se are not new. Prior art devices are available that will provide an output regardless of the orientation of the vehicle upon impact. A drawback of many prior art devices, however, is the fact that only an electrical output in the form of a switching action is available. An example of this type of device is shown in the Mintz Patent 2,881,276 that was issued Apr. 7, 1959. The Mintz patent discloses an all-ways acceleration switch that will close an electric circuit when the desired acceleration is detected. Specifically, the Mintz patent discloses an acceleration switch wherein a central conducting sphere is spring positioned within a conducting spherical cavity in such a manner that acceleration of the structure in any direction will result in a displacement of the sphere within the cavity with resulting contact between the sphere and the cavity walls. The contact of the sphere with the cavity wall closes an electrical circuit to operate the device in the desired manner. The Mintz patent is typical of prior art omnidirectional impact sensors in that only an electrical output is available. Such structure is incapable of providing a unidirectional mechanical output that can be used to provide a mechanical operating function.

In many munition fuzing applications, it is desirable to eliminate electrical circuitry and rely entirely upon mechanical functioning. In such systems, the impact sensor might provide a mechanical output that would directly release a firing pin upon impact. Impact sensors operating on the principle disclosed by the Mintz patent cannot be utilized in such applications since they provide an omnidirectional output. Even though a particular device may provide omnidirectional sensing, it would not be useful in a strictly mechanical operation unless it could also provide a unidirectional output.

The present invention is designed to provide omnidirectional impact sensing but only a unidirectional output. Regardless of the direction from which the inertial force is received, a mechanical output in a single direction results. This unidirectional output may be used directly to arm the fuze or to detonate the munition. This same mechanical output may be utilized to provide an electrical switching function if such is desired.

It is therefore a primary object of the present invention to provide an improved omnidirectional inertial force sensor having a unidirectional output.

Other objects of this invention will be apparent from the specification and claims when considered in connection with the accompanying drawings in which:

FIGURE 1 is a schematic drawing of an inertial sensor according to the present invention, shown in the normal position;

FIGURE 2 discloses a side view of a first embodiment of my invention incorporated in a munition fuze; and FIGURE 3 discloses a side view of a second embodiment of my invention.

Referring now to FIGURE 1, there is disclosed a schematic side view of the present invention. The sensor is mounted in a frame 10 having a generally flat upper surface with a well 11 formed therein. A pivot pin 12 is mounted in frame 10. Mounted generally parallel to the flat surface of frame 10 is an arm member 13 having a first end 14 and a second end 15. Arm member 13 can be considered to have an upper or first side, and a lower or second side facing the flat surface of frame 10. Formed transversely in the upper side of arm member 13 is an open groove 16. Pivot groove 16 is formed intermediate ends 14 and 15 of arm member 13 at a point generally corresponding to the center of gravity of arm member 13.

Arm member 13 is mounted on frame 10 with pivot pin 12 lying in pivot groove 16. Arm member 13 is thus pivotable about pin 12 in the plane of the drawing and is laterally movable in the plane toward the flat surface of frame 10. Pivot groove 16 is of sufficient depth to prevent loss of contact with pivot pin 12 during lateral movements of arm member 13.

Formed between first end 14 and pivot groove 16 in the lower side of arm member 13 is a concave cavity 20. In the preferred embodiment of my invention, cavity 20 is conical in shape and faces directly toward the flat surface of frame 10. A spherical ball member 21 is mounted in cup or cavity 20 between arm member 13 and the flat surface of frame 10. Ball member 21 is sized so as to make contact with the inner surfaces of cavity 20 and also with the flat surface of frame 10.

A coiled spring 22 is mounted in well 11 between arm member 13 and frame 10. Spring 22 thus exerts a force against the lower side of arm member 13 at a point between pivot groove 16 and second end 15. Thus, in the normal rest position of the inertial sensor, spring 22 tends to pivot arm member 13 in a counterclockwise direction about pin 12 to force arm member 13 against pin 12 and to force arm member 13 against ball 21. The sensor will remain in the normal position shown in FIGURE 1 until an inertial force is received.

The operation of the device shown in FIGURE 1 is as follows. When an upward inertial force is received, ball 21 will tend to move with the force in a direction away from frame 10. Ball 21 will thus force arm member 13 to pivot about pin 12 in a clockwise direction as shown by the arrows adjacent ends 14 and 15. The inertial force thus results in a mechanical movement of ends 14 and 15 that can be utilized to perform useful work. If an inertial force is received from a direction that is generally perpendicular to the plane of the drawing, ball 21 will again move in the direction of the force. Ball 21 will thus slide or roll along the flat surface of frame 10 against the sloping inner surface of cavity 20. Again, this coaction of ball 21 with cavity will cause arm member 13 to pivot in a clockwise direction about pin 12. The output from ends 14 and 15 previously described is again obtained.

If the inertial force is received from an upward direction that tends to drive ball 21 against the upper surface of frame 10, it is obvious that ball 21 cannot cause a pivotal movement of arm member 13. In this situation, arm member 13 itself acts as the inertial member to compress spring 22 and pivot itself in a clockwise direction about ball 21. Again, ends 14 and 15 provide the same unidirectional output. In all cases, the inertial sensor will return to the original position shown in FIGURE 1 after the inertial force is removed.

Referring now to FIGURE 2, there is disclosed a first preferred embodiment of my invention used as an impact sensor in a munition fuze. The fuze again includes a frame 10a that is shaped to accept the various components. The inertial sensor performs the function of holding a spring loaded firing pin 17 in a safe position until impact of the munition. Upon impact, firing pin 17 is released and driven by the spring into a detonator 18.

Under normal conditions, arm member 13a is locked in the position shown in FIGURE 2 by means of a pin 19 that extends through frame 10a and through a hole or slot formed in end 14a. End 14a has been curved or bent upwardly as shown in FIGURE 2 to accommodate pin 19. Also formed on or attached to end 14a is a hook portion 25 that holds firing pin 17 in the safe position. The mass of end 15a has also been increased to allow the use of a heavier spring 22a and to establish the center of gravity of arm member 13a at groove 16a.

The operation of the fuze shown in FIGURE 2 is as follows. Under normal storage conditions, the fuze remains in the position shown in FIGURE 2. When the munition employing this fuze is launched, pin 19 is removed either manually or automatically to release the sensing mechanism. So long as the inertial forces acting upon the fuze remain below a predetermined magnitude, the fuze components will remain in the position shown in FIGURE 2. Hook portion 25 effectively holds firing pin 17 in the safe position. When impact occurs, arm member 13a is caused to pivot in a clockwise direction about either pin 12a or ball 21a thereby moving end 14a upwardly to release firing pin 17. Firing pin 17 is then driven into detonator 18 to initiate the explosion. My invention thus provides a undirectional mechanical output in response to an inertial force received from any direction.

FIGURE 3 discloses a second preferred embodiment of my invention. The sensor operates in exactly the same fashion as that described for FIGURES 1 and 2. In the case of FIGURE 3, however, the output is taken from end 15b. A hook has been formed on end 15b that can be utilized in the same manner that hook 25 is used in FIGURE 2. End 15b always moves in the direction of the arrow in response to any inertial force applied to the sensor.

Many variations on this design will occur to those skilled in the art. Although a spherical ball has been used as the inertial member in the preferred embodiments disclosed herein, other shapes such as cones could be used as well. The shape of the cavity in which the inertial member rests could also be changed without departing from the invention. All that is necessary is that the inertial member and the cavity coact to produce the pivotal motion of the arm member in response to inertial forces. The amount of mechanical movement provided and the sensitivity of the device can also be changed without departing from the invention. The amount of movement achieved in response to any given inertial force can be changed by changing the distance between the pivot points, for example. The position of spring 22 with respect to pin 12 is an important factor in establishing the sensitivity of the sensor. The mass, size, length of the various components may also be changed to meet the requirements of a particular application. For these reasons, I do not intend to be limited by the disclosure but only by the scope of the appended claims.

I claim:
1. An omnidirectional acceleration sensor, comprising:
 (a) a frame;
 (b) an arm member having first and second ends;
 (c) a pivot pin mounted on said frame;
 (d) said arm member having an open pivot groove formed at an intermediate point thereon, said arm member being mounted with said pivot pin in said pivot groove so that said arm member is pivotable about said pin in a plane and is laterally movable in said plane in a direction away from said pin;
 (e) said first end of said arm member having a concave conical cup formed within a side thereof opposite said pivot groove;
 (f) a ball member responsive to inertial forces mounted in said cup between said arm member and said frame; and
 (g) a coiled spring mounted between said frame and said arm member opposite said pivot pin to normally force said arm member against said pin and to force said arm member against said ball member, a movement of said ball member in response to inertial forces causing said arm member to pivot about said pin, a movement of said arm member in response to inertial forces causing said arm member to pivot about said ball member.

2. Apparatus of the class described, comprising: first and second oppositely disposed sides;
 (a) a frame;
 (b) an arm member having first and second ends and
 (c) a pivot pin mounted on said frame;
 (d) said arm member having a pivot groove formed in said first side, said arm member being mounted with said pivot pin in said pivot groove so that said arm member is pivotable about said pin in a plane and is laterally movable in said plane;
 (e) said first end of said arm member having a concave cup formed in said second side;
 (f) an inertial member responsive to inertial forces mounted in said cup between said arm member and said frame; and
 (g) biasing means mounted between said frame and said second side of said arm member to normally force said arm member against said pin and to force said arm member against said inertial member.

3. The apparatus of claim 2 in which said pivot groove is formed generally at the center of gravity of said arm member.

4. The apparatus of claim 2 in which said inertial member is a spherical ball that coacts with said cup in response to inertial forces to pivot said arm member about said pin.

5. The apparatus of claim 2 in which said biasing means is a coiled spring mounted between said pivot groove and said second end.

6. The apparatus of claim 2 including means for detecting movement of said arm member resulting from an inertial force being applied to said apparatus.

References Cited

UNITED STATES PATENTS

| | | | |
|---|---|---|---|
| 2,428,029 | 9/1947 | Katcher | 200—61.45 |
| 2,834,292 | 5/1958 | Viasmensky | 102—70.2 |
| 2,879,349 | 3/1959 | Thompson | 200—61.45 |
| 2,881,276 | 4/1959 | Mintz et al. | 73—514 |

JAMES J. GILL, *Primary Examiner.*

R. S. SALZMAN, *Assitant Examiner.*